United States Patent

Roos

[15] 3,677,578
[45] July 18, 1972

[54] CONNECTION FITTING FOR A PIPE

[72] Inventor: Robert R. Roos, Decator, Ill.
[73] Assignee: Mueller Co., Decatur, Ill.
[22] Filed: Feb. 19, 1971
[21] Appl. No.: 117,024

[52] U.S. Cl..............................285/162, 285/208, 285/259, 285/346, 137/15
[51] Int. Cl..............................................F16l 41/04
[58] Field of Search..................285/162, 189, 196, 207, 208, 285/222, 216, 334.3, 338, 346, 390, 18, 259, 256; 85/32 CS, 83, 84; 151/14 CS; 137/15

[56] References Cited

UNITED STATES PATENTS

| | | | |
|---|---|---|---|
| 2,132,636 | 10/1938 | Maahs | 285/208 |
| 2,341,670 | 2/1944 | Stinson | 85/32 CS X |
| 2,439,685 | 4/1948 | Findley | 85/32 CS |
| 3,131,953 | 5/1964 | Windsor | 285/189 |
| 3,272,542 | 9/1966 | Haulik et al. | 285/189 |
| 3,434,746 | 3/1969 | Watts | 285/162 |
| 3,505,922 | 4/1970 | Tinnerman | 85/84 X |

Primary Examiner—David J. Williamowsky
Assistant Examiner—Wayne L. Shedd
Attorney—Cushman, Darby & Cushman

[57] ABSTRACT

A fitting and sealing sleeve for establishing a fluid tight connection with a main of the type constructed from asbestos-cement; the fitting has an exteriorly threaded tubular member having a through bore, one end of which on the exterior thereof has a reduced diameter threaded portion which progressively increases to a diameter substantially equal to the diameter of the remaining threaded portion of the tubular member; the sealing sleeve is constructed from a resiliently deformable material and has a helical coil partially embedded in its interior wall so that a portion of the coil's edge projects radially inwardly with respect to the longitudinal axis of the sleeve; arcuate ring segments are carried between adjacent turns of the coil at one end of the sleeve; when the sleeve is inserted into an opening in the main and the tubular member threaded down into the sleeve, the exterior surface of the tubular member will expand the sleeve to press it into sealing engagement with the wall of the opening and, when the tubular element is fully inserted into the sleeve, the ring segments will be expanded outwardly to form an external bead on the sleeve to prevent removal of the fitting back through the opening.

9 Claims, 7 Drawing Figures

Patented July 18, 1972
3,677,578
2 Sheets-Sheet 1
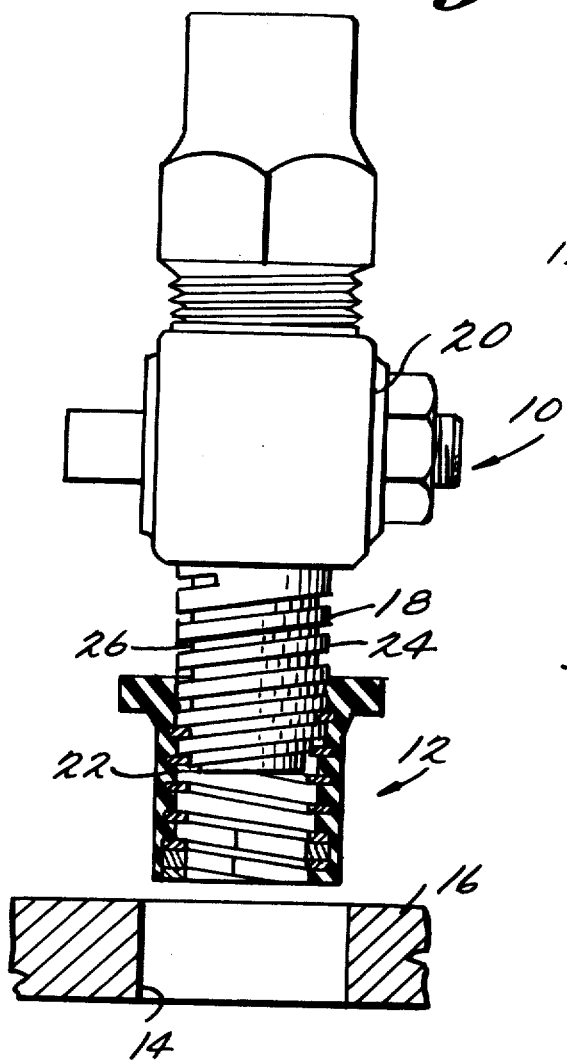
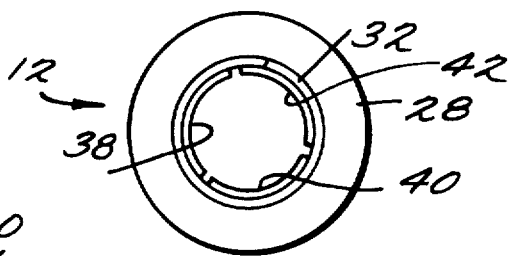
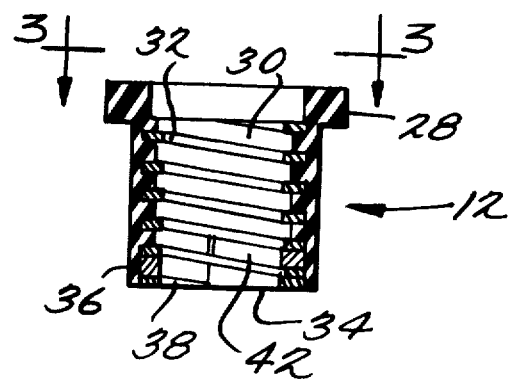
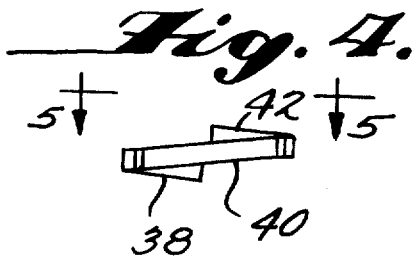
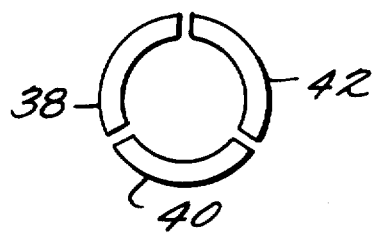
INVENTOR
ROBERT R. ROOS
BY Cushman, Darby & Cushman
ATTORNEYS

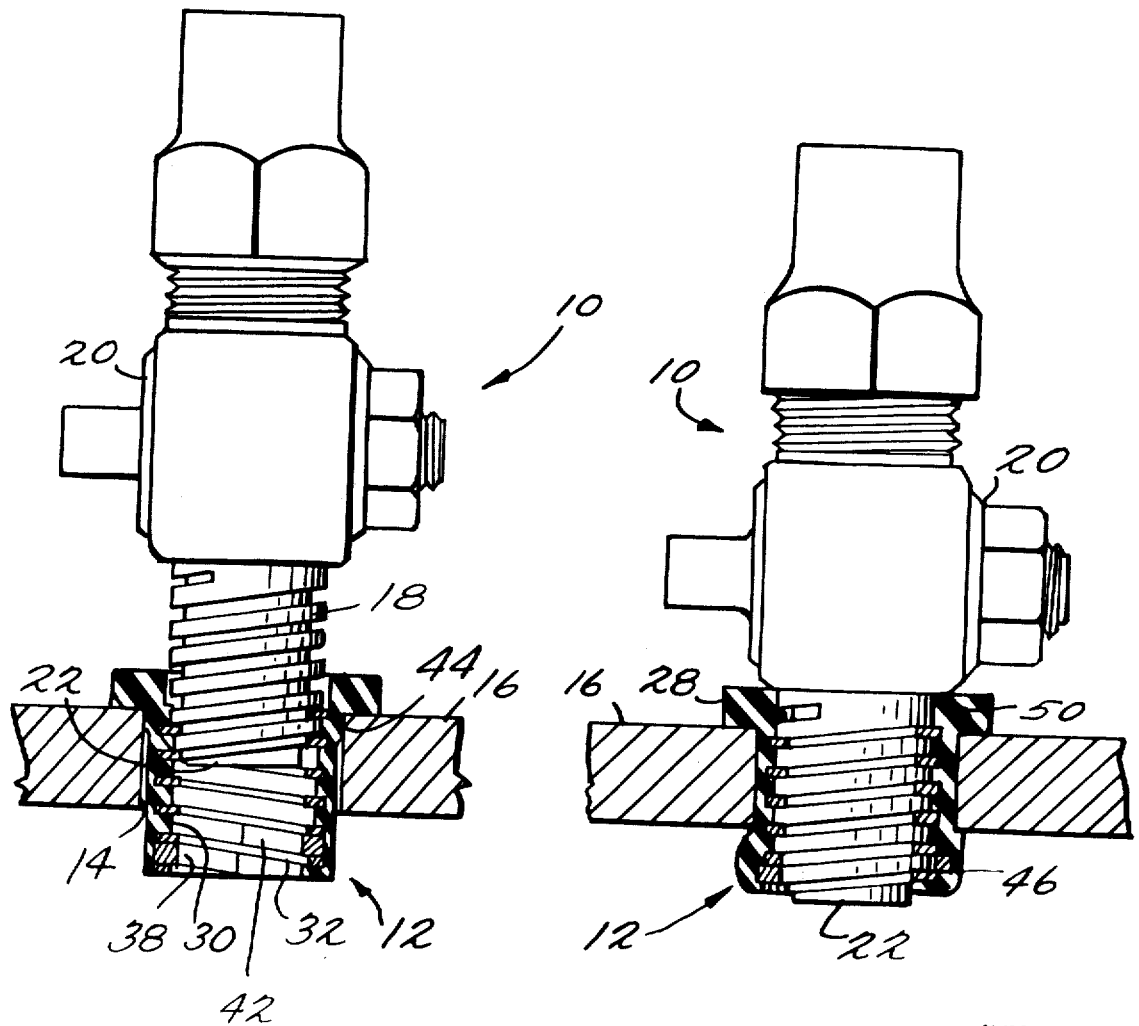

CONNECTION FITTING FOR A PIPE

The present invention relates to improvements in fluid connections, and more particularly, to an improved fitting and sealing element useful for mains and pipes constructed from asbestos-cement material. A novel feature of the invention resides in the provision of means for retaining the fitting in place once it is inserted through a lateral opening formed through the main and which does not require that access to the interior of the main be provided to establish the connection.

BACKGROUND OF THE INVENTION

In present day fluid distribution systems, particularly water systems, the use of mains and pipes constructed from materials such as asbestos-cement or the like has become more widespread since such pipes can be manufactured with less expense than pipes made from metal or metal alloys. Difficulties have been encountered, however, in establishing service fittings with mains constructed from such materials since it is not economically desirable or in some cases possible to form threaded lateral apertures in such conduits. Additionally, it has been necessary to avoid frictional contact between a metal fitting and the surface of a cement pipe since such engagement may result in fracturing and crumbling of the pipe material often rendering the establishment of a seal impossible. As a consequence, a number of pipe connections of the prior art cannot be successfully adapted for use with asbestos-cement type pipes or mains.

To overcome the foregoing difficulty, the prior art has suggested the use of a resilient gasket for surrounding a deformable bushing. Such structures have suffered from the disadvantage of imperfect sealing particularly where the fluid carried in the main is under high pressure.

A number of other prior art disclosures have resorted to the use of deformable sleeve members having end portions which expand upon insertion of a fitting in order to anchor the fitting in place. The fittings themselves are provided with serrated portions which engage the interior surface of the deformable sleeves to improve the quality of the seal. A number of these fittings rely principally on the deformation of the resilient sleeve to attain the anchoring of the fitting in the aperture of the main and, as a consequence, such fittings are liable to be displaced whenever the pressure in the main increases to a point resulting in further deformation of the sleeve material. The foregoing disadvantage could be overcome, of course, by making the sleeve material very rigid. However, doing so renders insertion of the fitting that much more difficult and time consuming.

Representative prior art references relating to the field of the present invention are listed below: U.S. Pat. No. 2,132,636 to Maahs filed Oct. 11, 1938; U.S. Pat. No. 2,566,502 to Smith filed Sept. 4, 1951; U.S. Pat. No. 3,131,953 to Windsor filed May 5, 1964; U.S. Pat. No. 3,272,542 to Hanlik et al. filed Sept. 13, 1966; U.S. Pat. No. 3,434,746 to Watts filed Mar. 25, 1969.

The present invention provides a fitting and sealing arrangement which avoids the foregoing disadvantages while still providing a fluid connection which can be quickly and easily established even when the main is carrying fluid under pressure. Additionally, the sealing sleeve of the present invention is uniquely adapted to cooperate with mains constructed of asbestos-cement type materials and which is capable of establishing an effective fluid tight seal with such materials.

SUMMARY OF THE INVENTION

The improved fitting and cooperating sealing sleeve of the present invention consists of a threaded tubular element having a through bore and a deformable sealing sleeve having at one end an enlarged flange for engaging the exterior surface of the main when the sleeve is inserted into an opening of predetermined diameter formed in the main. At the end of the tubular member which is inserted first into the opening of the main, the threaded surface is initially of a reduced diameter relative to the exterior diameter of the threaded surfaces on the remaining portion of the member. This reduced diameter portion progressively increases in diameter in screw-like fashion through at least one turn or circumference of the tubular member to a diameter substantially equal to that of the remaining portion of the member. The interior surface of the sealing sleeve has a helical coil element partially embedded therein with the inner edges of the coil element protruding into the interior of the sleeve, thereby providing complementary threads for interengaging with the threaded surface of the tubular member. The radial thickness of the sealing sleeve is such that when inserted into the opening in the main and when the tubular member is threaded therein, the sealing sleeve will be expanded radially outwardly against the wall of the opening into sealing engagement therewith. Arcuately shaped, helically bent ring segments are carried at one end of the sealing sleeve on the interior thereof between the first and second turns of the coil element. When the tubular member is fully inserted into the sealing sleeve, the arcuate, helically formed ring segments will be expanded outwardly resulting in the formation of a bead on the lower exterior surface of the sleeve. The exterior diameter of the bead will be greater than the diameter of the aperture so that removal of the fitting back through the opening of the main is prevented. With this anchoring arrangement, the fitting may be used with asbestos-cement type pipes since metal contact with the pipe material is avoided yet a very rigid structural anchoring of the fitting is obtained with the metallic ring segment anchoring elements shielded by the resilient sleeve from contact with the pipe material.

It is an important object of the present invention, therefore, to provide a fitting and sealing element for cooperation therewith whereby a fluid tight connection can be established with a main without requiring access to the interior of the main. Another object of the present invention is to provide a fitting and sealing sleeve capable of quickly and easily establishing a fluid tight connection with mains or pipes constructed from asbestos-cement materials. A further object of the present invention is to provide a fitting having anchoring means which cannot be deformed under the influence of fluid pressure and which cannot be radially removed from the opening in the main under the influence of increased fluid pressures in the main.

Other objects and attendant advantages will become apparent as further consideration is given to the following detailed description and the accompanying drawings in which:

BRIEF DESCRIPTION OF THE DRAWINGS

FIG. 1 is an elevational view partly in section of the fitting and sealing sleeve of the present invention;

FIG. 2 is a vertical sectional view of the sealing sleeve, coil and ring segments of the present invention;

FIG. 3 is a view taken along lines 3—3 of FIG. 2;

FIG. 4 is a detailed view in elevation of the three anchoring ring segments of the present invention;

FIG. 5 is a plan view taken along lines 5—5 of FIG. 4;

FIG. 6 is an elevational view partly in section of the fitting and sealing sleeve of the present invention illustrating the insertion of the fitting into the sleeve with the sleeve in the main; and FIG. 7 is a view in elevation partly in section showing the fitting fully inserted into the opening of the main.

DETAILED DESCRIPTION OF THE INVENTION

Referring now to the drawings wherein like numerals designate corresponding parts throughout the several views, there is illustrated in FIG. 1 the fitting 10 and sealing sleeve 12 of the present invention located above an aperture 14 which has been bored through the surface of a pipe or main 16. It will be understood, of course, that while the fitting of the present invention together with its sealing sleeve is ideally suited for establishing a fluid connection with mains constructed from asbestos-cement type material, the fitting can be utilized with equally good results with pipes and mains constructed from other materials. The fitting 10 comprises a tubular member 18 which is helically threaded. The fitting 10 may be constructed with a conventional corporation stop 20 attached thereto. However, if desired, the upper end of the tubular member 18 may be provided with other fluid flow controlling apparatus as required, or may be simply provided with a tightening nut. The tubular member 18, of course, is provided with a through bore.

The threads of the tubular member 18 at the lower end 22 which is first inserted into the sleeve 12 are of the initially reduced exterior diameter but progressively increase in diameter through at least one turn to a diameter substantially equal to the exterior diameter of the threaded surface on the remaining portion of the tubular member 18. In the preferred embodiment illustrated, the surface between the grooves of the threads on the tubular member 18 are smooth and present a larger surface area as indicated at 24 than is provided in the grooves 26 for a purpose which will be described hereinafter.

Turning now to FIGS. 2 and 3, there is illustrated a sealing sleeve 12 of the present invention which may be constructed from any suitable elastomeric material such as rubber or the like. The exterior diameter of the sleeve 12 has such a dimension as to permit its easy insertion into the aperture 14. An annular flange 28 is provided about one end of the sleeve 12 to overlap the opening 14 and to engage the exterior surface of the main 16. The interior surface 30 of the sleeve 12 is formed with an interior diameter that is slightly smaller than the exterior diameter of the tubular member 18. A helical coil element 32 is disposed within sleeve 12 and partially embedded in the interior surface 30. The longitudinal dimension of each turn of the coil 32 is such that the coil element will interengage with the grooves 26 on the tubular member 18 while the distance between adjacent turns of the coil element is such that the surfaces 24 of the tubular member 18 will interfit therebetween. With this arrangement, a threaded interengagement can be achieved between the sealing sleeve and fitting 10. At end 34 of sleeve 12 a helical recess 36 is provided between the initial adjacent turns of the coil element 32 for receiving three arcuately shaped and helically bent ring segments 38, 40 and 42 which may be constructed from brass or other suitable rigid material. The coil element 32 and fitting 10 may also be formed from a metal such as brass.

With reference to FIGS. 3, 4 and 5, the disposition and relationship between the three ring segments is more clearly illustrated. The pitch of the ring segments if extended for more than one turn thereof, should be approximately equal to the pitch of the coil 32. The thickness of the respective ring segments is slightly larger than that of the coil element 32 so that as shown in FIG. 3 the ring segments will project beyond the edges of the coil element 32 into the interior of the sleeve 12.

With reference to FIG. 6, sleeve 12 is illustrated as being inserted into the aparture 14 with the tubular 18 of the fitting 10 being partially threaded therein. As the threaded surfaces of widest diameter [24 e.g.] come into engagement with the surfaces 30 between the coil elements 32, the sleeve is expanded radially outwardly as at 44 into sealing engagement with the wall of the opening 14. Upon continued threading of the tubular member into the sleeve, end 22 will first come into contact with ring segment 42 and move that segment radially outwardly and subsequently, in like manner, the ring segments 40 and 38 until the tubular member is fully inserted into the sealing sleeve 12 as illustrated in FIG. 7. The radial movement of the ring segments forms an external bead 46 about the exterior of the sleeve 12, the external diameter of the bead being greater than the diameter of the opening 14 so that the fitting is locked in place and removal is prevented. The fitting may be further threaded into the sleeve to bring the flange 28 into sealing contact with the external surface of the main 16 by virtue of the pressure exerted on the flange 28 by the shoulder 50 of the corporation stop 20.

While the foregoing description of the installation of the fitting has been illustrated in conjunction with a main that is not carrying fluid under pressure, it will be understood that a fluid connection using the fitting and sealing sleeve of the present invention may be established where the main carries fluid under pressure by using a suitably adapted tapping machine.

The foregoing specification illustrates the invention in a preferred and practical form but the elements illustrated are capable of modification without departing from the spirit and scope of the invention as set forth in the appended claims.

What is claimed is:

1. The combination of a fitting and a sealing element for insertion into a lateral opening in a main, said fitting comprising a member having an exterior thread thereon terminating adjacent an outwardly extending annular shoulder, said thread at its end farthest from said shoulder having an initially reduced exterior diameter which progressively increases through at least one turn to its maximum diameter, said sealing element comprising a resiliently deformable sleeve having an exterior diameter permitting insertion into the opening and having a longitudinal extent greater than the wall thickness of the main, said sleeve having an annular flange at one end thereof with an external diameter greater than the diameter of the opening, said sleeve further having an interior surface with a helical coil partially embedded therein and having inner edges of the coil projecting radially inwardly from said interior surface, a plurality of arcuately curved retainer elements embedded at least partially in said sleeve between adjacent turns of said coil at an end farthest from said annular flange, said retainer elements being urged radially outwardly to form an exterior bead having an exterior diameter greater than that of the opening in the main when said member is threaded into said coil in said sleeve.

2. The combination as claimed in claim 1 wherein said member is tubular in shape and is provided with a through bore.

3. The combination as claimed in claim 1 wherein said retainer elements comprise three substantially identically formed segments which are square in cross-section and which are curved in the form of a helix with a pitch substantially equal to the pitch of said coil embedded in said sleeve.

4. The combination as claimed in claim 1 wherein said helical coil is formed from a flat strip of metallic material with the wider surfaces of the strip extending generally radially with respect to the longitudinal axis of the coil.

5. The combination as claimed in claim 1 wherein said coil and said retainer elements are constructed from brass.

6. The combination as claimed in claim 4 wherein the interior diameter of said sleeve is greater than the interior diameter of said helical coil.

7. The combination as claimed in claim 1 wherein a corporation stop is secured to said tubular member, the side of said stop adjacent said member comprising said shoulder.

8. The combination as claimed in claim 1 wherein said sealing element is constructed from rubber.

9. The combination as claimed in claim 1 wherein the interior diameter of said sleeve is less than the maximum exterior diameter of said member so that, when said member is inserted into said sleeve with said sleeve positioned in the opening, the exterior thread of said member will radially expand said sleeve to press the exterior surface of said sleeve into sealing engagement with the wall of the opening.

* * * * *